US007088235B1

(12) United States Patent
Carricut

(10) Patent No.: US 7,088,235 B1
(45) Date of Patent: Aug. 8, 2006

(54) METHOD AND APPARATUS FOR RETROFITTING A PATIENT CALL SYSTEM

(76) Inventor: Lee M. Carricut, 224 E. Pinhook Rd., Lafayette, LA (US) 70518

(*) Notice: Subject to any disclaimer, the term of this patent is extended or adjusted under 35 U.S.C. 154(b) by 93 days.

(21) Appl. No.: 10/924,307

(22) Filed: Aug. 20, 2004

(51) Int. Cl.
*G08B 1/08* (2006.01)
*H04Q 7/00* (2006.01)

(52) U.S. Cl. ........................... 340/539.12; 340/573.1; 340/539.13

(58) Field of Classification Search .. 340/539.1–539.3, 340/573.1
See application file for complete search history.

(56) References Cited

U.S. PATENT DOCUMENTS

| | | | | |
|---|---|---|---|---|
| 4,598,275 | A * | 7/1986 | Ross et al. | 340/573.4 |
| 4,952,928 | A * | 8/1990 | Carroll et al. | 340/10.41 |
| 5,513,241 | A * | 4/1996 | Dimitriadis et al. | 340/7.22 |
| 5,600,305 | A | 2/1997 | Stafford et al. | |
| 5,729,203 | A | 3/1998 | Oka et al. | |
| 5,793,290 | A * | 8/1998 | Eagleson et al. | 340/573.4 |
| 5,838,223 | A | 11/1998 | Gallant et al. | |
| 5,877,675 | A | 3/1999 | Rebstock et al. | |
| 5,963,137 | A * | 10/1999 | Waters, Sr. | 340/573.4 |
| 6,144,303 | A * | 11/2000 | Federman | 340/573.4 |
| 6,160,478 | A * | 12/2000 | Jacobsen et al. | 340/539.12 |
| 6,445,299 | B1 * | 9/2002 | Rojas, Jr. | 340/573.1 |
| 6,897,780 | B1 * | 5/2005 | Ulrich et al. | 340/573.1 |
| 2004/0021573 | A1 * | 2/2004 | Hoffman et al. | 340/573.1 |
| 2004/0218384 | A1 * | 11/2004 | Newton et al. | 362/183 |

* cited by examiner

*Primary Examiner*—Jeffery Hofsass
*Assistant Examiner*—Hoi C. Lau
(74) *Attorney, Agent, or Firm*—Robert N. Montgomery

(57) ABSTRACT

An improved retrofit wireless remote nurse call apparatus requiring no system conversion or structural adaptation uses battery power and decretive water resistant call buttons with electronic key for selective response that are both functional and inexpensive. The transmitter and receiver are pre-paired thus requiring no on site programming. The receiver plugs into existing call button wall jack. Options include parallel operation with existing call buttons plugged into the receiver and battery recharging.

18 Claims, 7 Drawing Sheets

METHOD AND APPARATUS FOR RETROFITTING A PATIENT CALL SYSTEM

1. FIELD OF THE INVENTION

This invention relates generally to a method and apparatus for signaling a nurse's attention to a patient's room and more particularly to an improved apparatus and method for retrofitting such systems with a low cost battery powered receiver requiring little or no on site technical installation or programming.

2. BACKGROUND OF THE INVENTION

Electronically signaling a nurse to a patient's room is well known within the art and is generally an accepted practice in most all-nursing facilities. Such systems consist of a nurse call button located on the patient's bed connected to a wall jack which when activated by the patient sends a signal to the nurse's station indicating the room making the call. The nurse then responds by questioning the room regarding the assistance required. Remote wireless call buttons have been retrofitted to such systems to allow for the patient to summon assistance even when they are not in the bed. Such wireless remote call buttons seem to work fairly well for private rooms or in a home health care environment where there is no question as to which patient is calling.

Retrofitted call buttons have a number of inherent drawbacks. Such devices as that disclosed by Rojas Jr. in U.S. Pat. No. 6,445,299 indicated the necessity for several elements that are not necessary and require extensive installation and programming thus increasing expense. Programming is accomplished by extensive communication between the remote call button transceiver and the wall-mounted transceiver, requiring considerable setup time.

Further, Rojas teaches the necessity for utilizing a 110 volt wall outlet for its power supply thus tying up an outlet that may be necessary for other equipment and further making the call system subject to failure during a power outage. This system also relies on Radio Frequencies, which are subject to various forms of interferences, and in most cases requires a Federal Communication License. It also utilizes a display unit in combination with its two transceivers, must be mounted to the wall adjacent the call station jack and hard wired to a coupling interface jack. The call station phono jack must be converted to receive the coupling interface jack and the existing hardwired call button. In most cases, the existing bed mounted call button is simply plugged into the outlet. If both the remote and the existing call button are required, such as with the Rojas system, a dual plug receptacle is required.

The Rojas system discloses a method for distinguishing between two or more patients in the same room wearing identical remote wireless call buttons. However, the Rojas system does not disclose what happens if one of the patients is in another room or in the hall. The nurse can be summoned to the room but still not know which patient needs assistance. Therefore, there is a need for a less expensive apparatus that requires no technical installation that can differentiate between patients within the same room and provide other features beneficial to the well being of the patient.

3. SUMMARY OF THE INVENTION

An improved retrofit wireless remote nurse call apparatus requiring no system conversion or structural adaptation uses battery power and decretive water resistant call buttons with electronic key for selective response that are both functional and inexpensive. The transmitter and receiver are pre-paired thus requiring no on site programming. The receiver plugs into existing call button wall jack. Options include parallel operation with existing call buttons plugged into the receiver and battery recharging.

It is therefore an object of the instant invention to provide a low cost combination electronically paired call button and battery powered receiver that is cooperative with an existing nurse call system without modification to the existing system or dependent on existing power supplies.

4. BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

5. DETAILED DESCRIPTION OF THE PREFERRED EMBODIMENT

Figure 1:
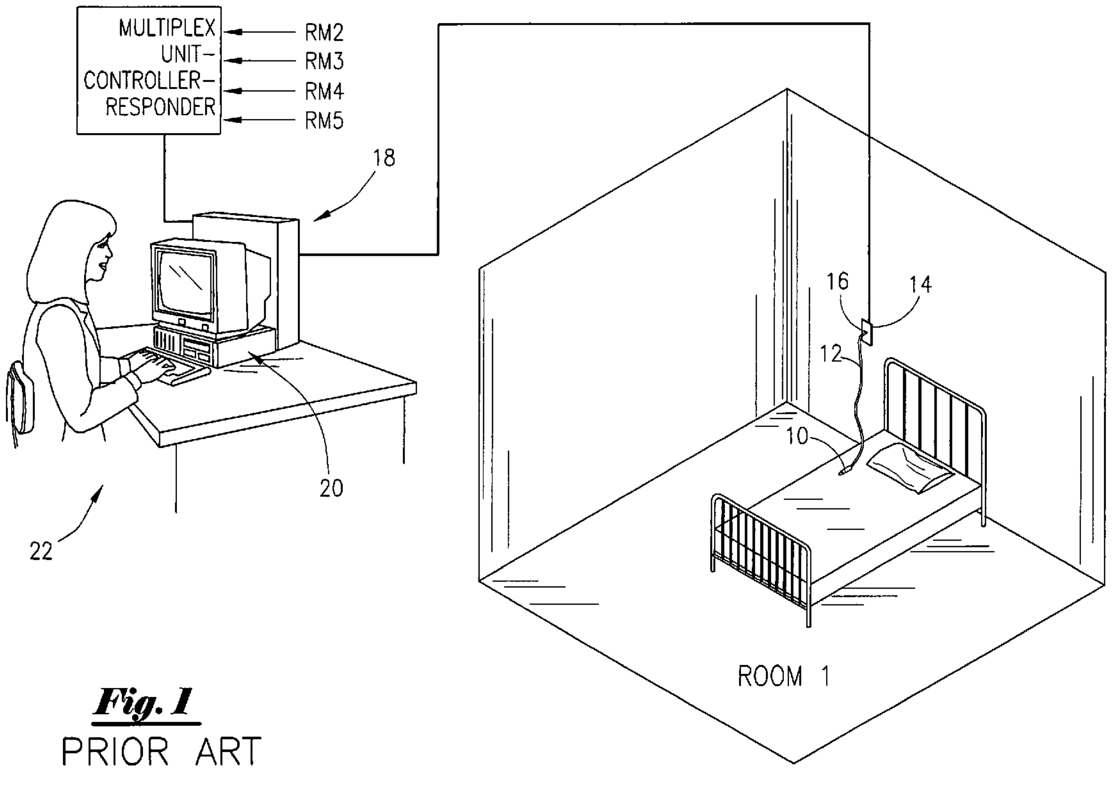
Fig. 1 PRIOR ART
FIG. 1 is an isometric view of a typical prior art arrangement of a nurse call system.

As shown in FIG. 1 the typical nursing facility room 1 is equipped with a means for summing nurse assistance. Such means generally includes a call button 10 clipped to the patent's bed or in some cases is and integral component of the bed itself. The call button 10 is usually attached by an electrical cord 12 to a fixed wall jack 14 preferably by a removable plug 16 especially where the button 10 is an integral part of the bed to allow for easy bed mobility. The wall jack 14 being an integral part of the nurse call system 18 is connected electrically to a computer system 20 located at the central nurse's monitoring station 22 which is capable of receiving a signal from a patent and where the caller is identified and a verbal response over a speaker 23, seen in FIG. 2, is transmitted to the caller for confirmation of the need for assistance.

Obviously, the need for patient mobility is often required in such manner as to allow the patient to move about the room and within the general location of his bed. However, since other remote transmitter systems have exhibited various shortcomings including higher than necessary cost factors, it is therefore, advantageous to provide a cost efficient transmitter and receiver adaptive to existing nurse call systems that requires little or no technical installation or complicated programming.

Figure 2:
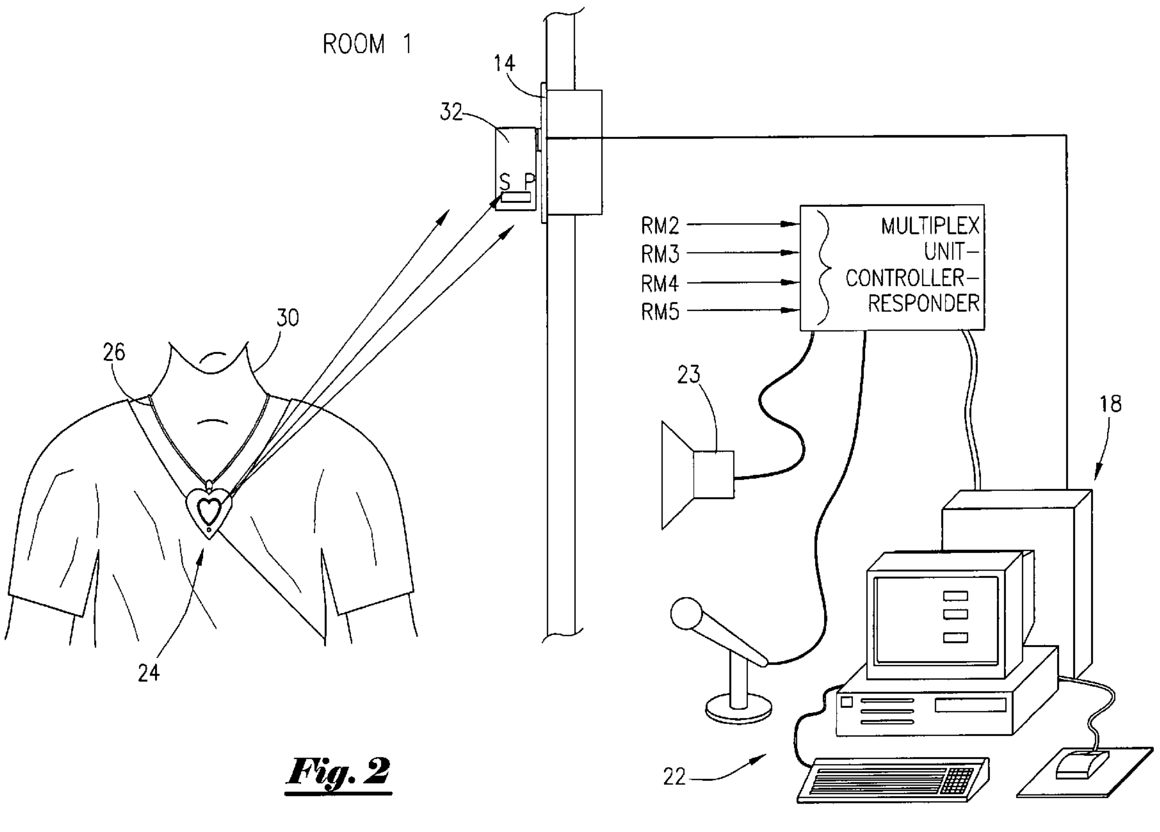
FIG. 2 is a pictorial view of the preferred embodiment connected to the existing nurse call system shown in FIG. 1.

By looking at FIG. 2, we see that the number of elements for such a remote transmitter and receiver for existing nurse call systems can be reduced to only two simple elements. A mobile signal transmitter button module assembly 24 worn as a pendent suspended by a ribbon or chain 26 around the patient's neck 30, and receiver module 32 fitted with a phone jack plug cooperative with the communication wall jack 14 leading to the nurse call monitoring station 22.

Figure 3:
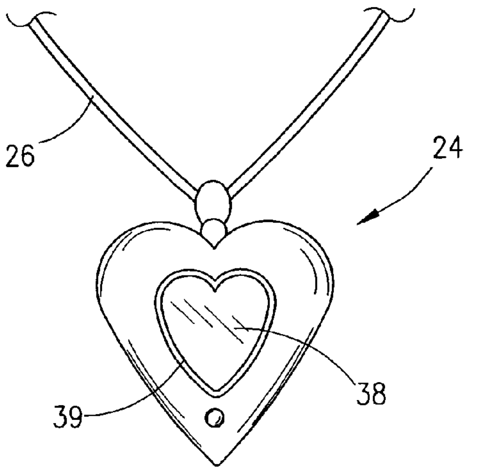
FIG. 3 is a front elevation view of one embodiment of the signal transmitter pendent module.
Figure 4:
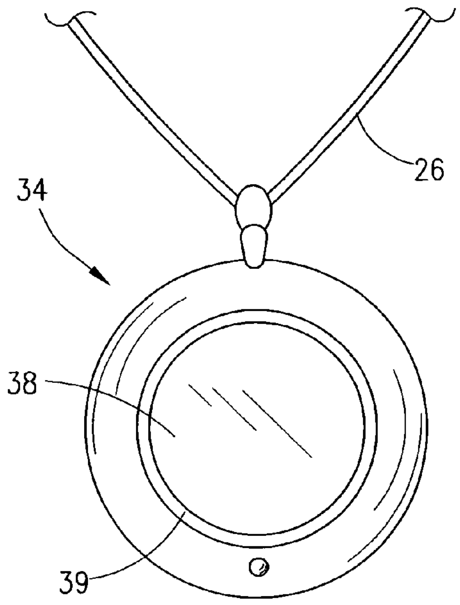
FIG. 4 is a front elevation view of a second embodiment of the signal transmitter pendent module.
Figure 5:
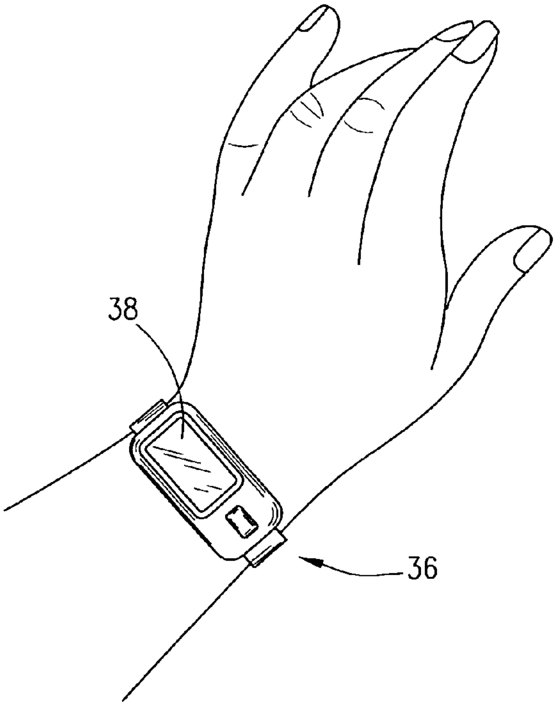
FIG. 5 is an isometric illustration of a signal transmitter embodiment adapted for attachment to a patient's wrist.
Figure 6:
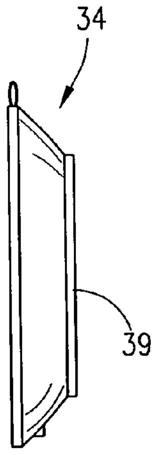
FIG. 6 is a side view of the signal transmitter pendent shown in FIG. 4.

The signal transmitter or call button assembly shown in more detail in FIG. 3 as a heart shape can be provided in multiple embodiments such as the round pendent assembly 34 seen in FIG. 4 or configured as bracelet assembly 36 to be worn on the patient's wrist as seen in FIG. 5. In each of the embodiments 24,34,36, the call button 38 is a large and dominate feature of the signal transmitter module assembly 24,34,36. It should also be noted that in addition to the call button modules being water resistant to allow the patient to wear the pendent or bracelet in the shower or resist spills the pendent, as seen in FIG. 6, is provided with a minimum thickness and is well rounded for comfort. The button is also recessed below a rim 39 to prevent accidental activation.

Figure 7:
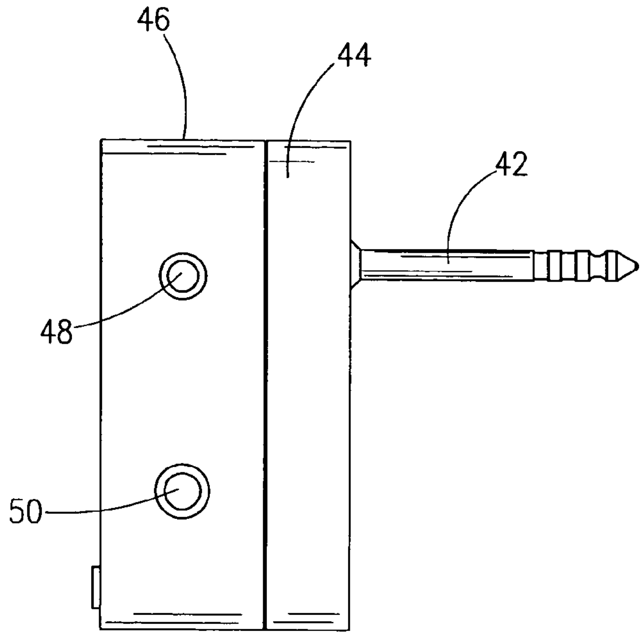
FIG. 7 is a side elevation view of the preferred receiver module.
Figure 8:
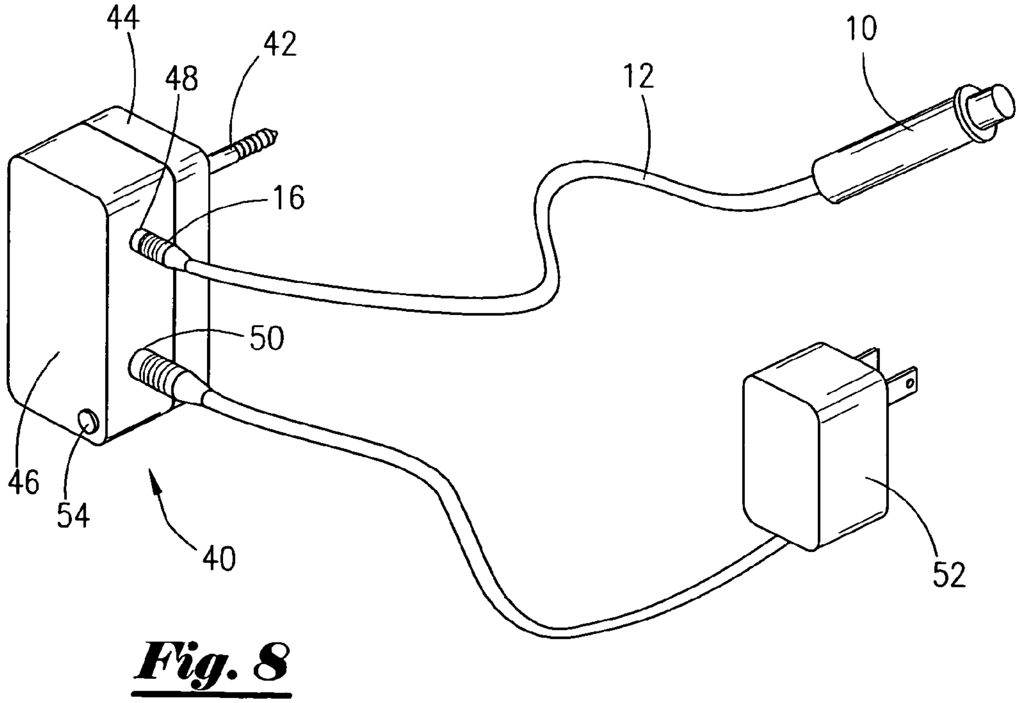
FIG. 8 is an isometric view of the receiver module with accessories connected thereto.
Figure 9:
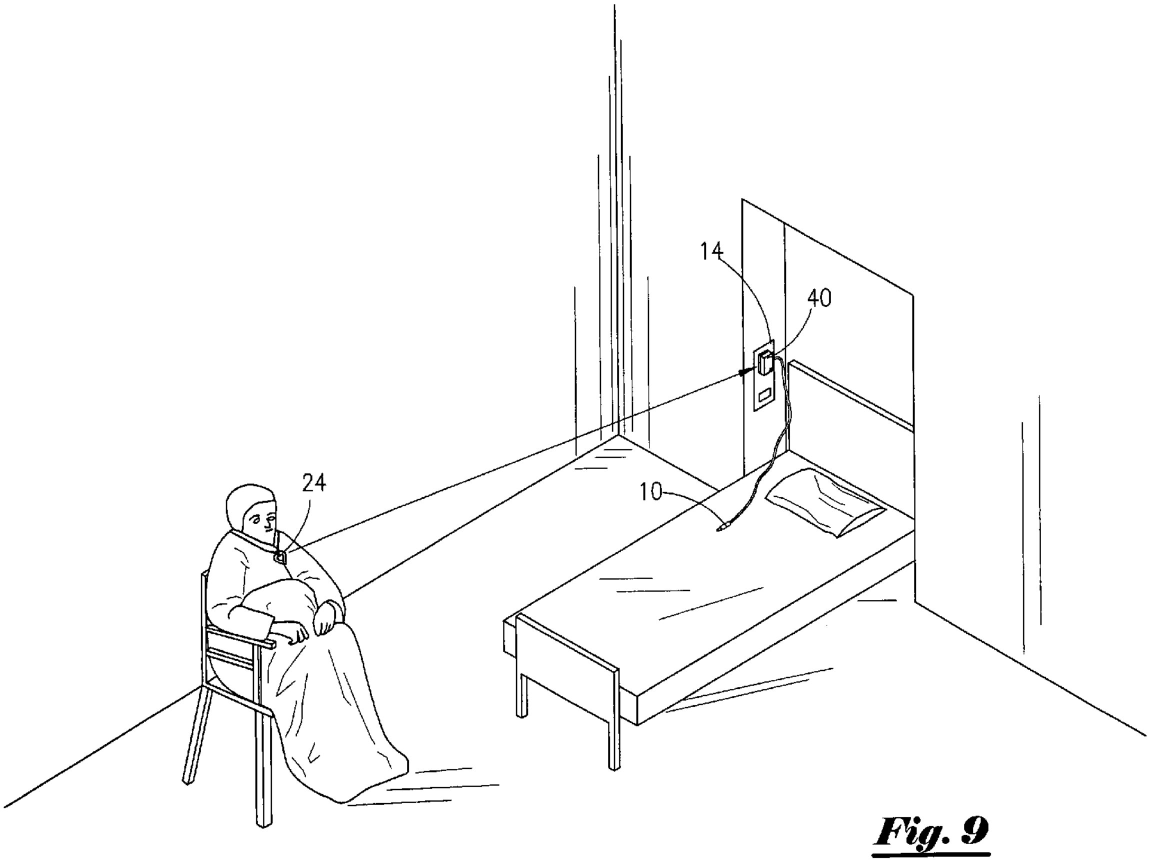
FIG. 9 is an isometric illustration of a patient with remote transmitter pendent transmitting to its respective receiver module.

Looking now at FIGS. 7,8 we see the battery powered receiver module 40 includes an integral phono plug 42 extending from the rear of the receiver case 44, a receiver cover 46 fitted with a call button jack 48 for receiving the existing call button plug 16, a charger jack 50 for receiving An AC/DC power adaptor charging transformer 52 for periodically recharging onboard receiver batteries and a LED indicator light 54 signaling reception from the signal transmitter 24 as shown in FIG. 9. It should be noted that the system might continue operation while charging the battery.

Figure 10:
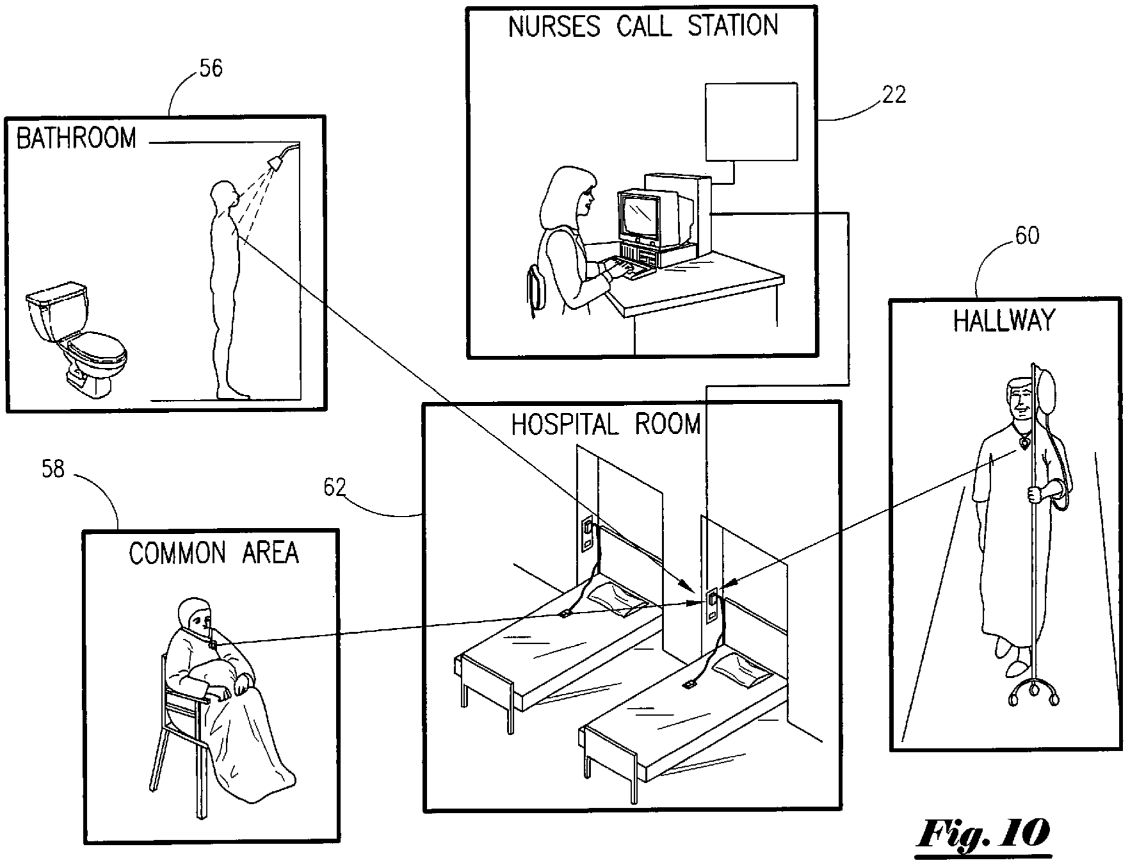
FIG. 10 is an illustrated view of the transmitter at different locations transmitting to the selected receiver.

As illustrated in FIG. 9 the signal transmitter 24, 34, 36 worn around the patient's neck or as a bracelet may transmit a signal to the receiver module 40 plugged into the jack 14 from any place in the room. However, it is well known that low voltage UHF transmission allows interference free transmission and reception from any space within range of the receiver, such as from the bathroom or shower 56, a common area 58 such as a dinning hall or simply walking in the hall 60 as illustrated in FIG. 10. In any such case, the signal transmitter 24,34,36 transmits a coded signal to the receiver 40 located in the patient's room adjacent the patient's bed. Activation of the receiver 40, set to recognize the coded signal, activates the multiple unit controller identifying the patient and room number.

Figure 11:
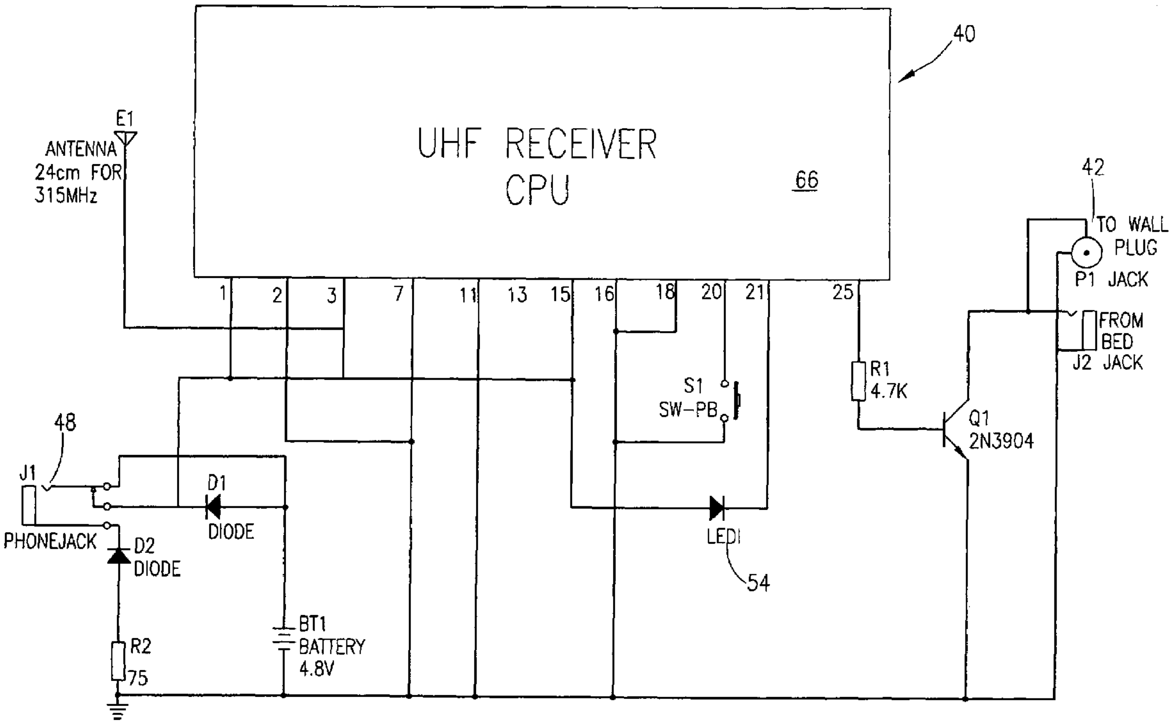
FIG. 11 is an electrical schematic of the receiver module.

As diagrammed in FIG. 11 the receiver module 40 receives a coded UHF signal from a push button transmitter 23,34,36 located within range of the receiver by way of the antenna E1. When the receiver CPU 66 matches the signal, normally open switch S1 closes and the LED1 light 54 on the face of the receiver module is activated completing the circuit to the phono plug P1 item 42 in FIG. 7 thereby activating the existing nurse call system. The existing bed push button may be plugged into J2 item 50 seen in FIG. 7 thereby providing redundancy by having both a bedside push button and a remote push button for summing assistance. Jack J1 or Item 48 seen in FIG. 7 provides a means for charging the batteries BT1.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. An improved retrofit nurse call button system adaptive to a preexisting nurse call system, having at least one preexisting patient-activated call button disposed near a patient's bed, electrically coupled to a wall jack located within a patient's room, the wall jack being electronically coupled to a central nurses monitoring station capable of receiving a signal activated by said call button the retrofit nurse call system comprising:

a) a decorative remote signal transmitter having necklace means for attachment to a patient;

b) a modular electronic housing having an integral electrical plug member cooperative with a nurse call system wall jack receptacle, said housing containing an electronic signal receiver having a battery as its primary source of power said receiver selectively pre-paired electronically with said signal transmitter; and c) an electronic circuit integral within said receiver for emulating said preexisting patient-activated call button.

2. The retrofit nurse call button system according to claim 1 further comprising a temporary charging means for recharging said battery.

3. The nurse patient call button system according to claim 1 wherein said housing further comprising a receptical jack for temporarily receiving a plug connected electrically to said preexisting patient-activated call button.

4. The retrofit nurse call button system according to claim 1 wherein said signal transmitter emits a pre-selected electronic key coded UHF signal.

5. The retrofit nurse call button system according to claim 4 wherein said receiver is factory set and electronically paired with said signal transmitter prior to its intergration within said modular electronic housing.

6. The retrofit nurse call button system according to claim 2 wherein said means for recharging said battery is an AC/DC power-adaptor.

7. The retrofit nurse call button system according to claim 6 wherein said receiver further comprises circuitry for allowing said AC/DC power adaptor to power said receiver while recharging.

8. The retrofit nurse call button system according to claim 7 wherein said receiver module comprises circuitry for protecting said receiver from reversed polarity D.C. power.

9. The retrofit nurse call button system according to claim 1 wherein said transmitter is a pendant shaped like a heart having means for attachment to a patient.

10. The retrofit nurse call button system according to claim 1 wherein said transmitter is a round shaped pendant having means for attachment to a patent.

11. The retrofit nurse call button system according to claim 1 wherein said transmitter takes the form of a decorative wristband.

12. The retrofit nurse call button system according to claim 1 wherein said transmitter is water resistant.

13. A retrofit nurse call button system adaptive to a preexisting nurse call system having at least one preexisting patient-activated call button disposed near a patient's bed, electrically coupled to a wall jack receptical located within a patient's room, the wall jack receptical being electronically coupled to a central nurses monitoring station capable of receiving a signal activated by said call button, the retrofit nurse call system comprising:

a) a decorative pendant housing a remote signal transmitter therein having fastening means for attachment to a patient;

b) a housing having an integral jack plug extending there-from cooperative with said wall jack receptacle said housing containing a receiver paired electronically with said signal transmitter; and c) an electronic circuit integral within said receiver for closing an electronic switch connected to said jack plug, upon receipt of a coded signal from said transmitter, thereby emulating said preexisting patient-activated call button.

14. The retrofit nurse call button system according to claim 13 wherein said receiver is connected directly to said wall jack receptical by way of said integral jack plug.

15. The retrofit nurse call button system according to claim 13 wherein said preexisting patient-activated call button is plugged into and connected electrically to the retrofit receiver in parallel with said integral jack plug.

16. The retrofit nurse call button system according to claim 13 wherein said receiver is a low voltage UHF system having a battery as its primary source of power.

17. A method for adaptively retrofitting a nurse call system, having a call button plugged into a wall port connected to a nurse's call station, with a remote mobile call button comprising the steps of:

a) providing a modular housing containing a battery powered receiver electronically paired with a remote signal transmitter housed within a pendant said modular housing having a receptacle for receiving a jack plug connected electrically to said call button and an integral jack plug mounted thereto for connection with said wall port;

b) plugging said jack plug directly into a nurse call system wall port; and c) attaching said pendant to a patient.

18. The method according to claim 17 further comprising the step of plugging said hard wired call button into said receptacle located within said housing.

* * * * *